United States Patent
Lee

(10) Patent No.: US 10,457,868 B2
(45) Date of Patent: Oct. 29, 2019

(54) LIQUID CRYSTAL COMPOSITION AND LIQUID CRYSTAL DISPLAY INCLUDING THE SAME

(71) Applicant: Samsung Display Co. Ltd., Yongin, Gyeonggi-do (KR)

(72) Inventor: Kyung Hee Lee, Suwon-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 122 days.

(21) Appl. No.: 15/261,887

(22) Filed: Sep. 10, 2016

(65) Prior Publication Data

US 2017/0152442 A1 Jun. 1, 2017

(30) Foreign Application Priority Data

Nov. 27, 2015 (KR) .......................... 10-2015-0167424

(51) Int. Cl.
  *C09K 19/30* (2006.01)
  *G02F 1/1337* (2006.01)
  (Continued)

(52) U.S. Cl.
  CPC ...... *C09K 19/3098* (2013.01); *C09K 19/3003* (2013.01); *G02F 1/1368* (2013.01);
  (Continued)

(58) Field of Classification Search
  None
  See application file for complete search history.

(56) References Cited

U.S. PATENT DOCUMENTS 4,676,604 A    6/1987  Petrzilka
5,174,920 A *  12/1992 Iijima ............... C09K 19/3001
                                                    252/299.01
(Continued)

FOREIGN PATENT DOCUMENTS

CN    103333700 A  * 10/2013
CN    103666485 A  *  3/2014
(Continued)

OTHER PUBLICATIONS

English translation of CN 103333700. (Year: 2013).*
(Continued)

*Primary Examiner* — Chanceity N Robinson
*Assistant Examiner* — Anna Malloy
(74) *Attorney, Agent, or Firm* — Cantor Colburn LLP

(57) ABSTRACT

A liquid crystal composition, including at least one of: a first compound represented by Chemical Formula 1 below, a second compound represented by Chemical Formula 2 below; and a third compound represented by Chemical Formula 2' below:

Chemical Formula 1

Chemical Formula 2

(Continued)

-continued

Chemical Formula 2'

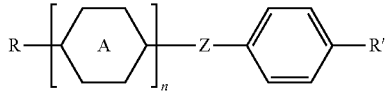

The definitions of A, Z, n, R, and R' are provided herein. Also provided is a liquid crystal display, including: a first display panel including a thin film transistor; a second display panel facing the first display panel; and a liquid crystal layer including at least one of a first compound represented by Chemical Formula 1, a second compound represented by Chemical Formula 2, and a third compound represented by Chemical Formula 2' and a reactive mesogen.

17 Claims, 4 Drawing Sheets

(51) Int. Cl.
  *G02F 1/1368* (2006.01)
  *C09K 19/34* (2006.01)
(52) U.S. Cl.
  CPC .............. *G02F 1/133711* (2013.01); *C09K 2019/3018* (2013.01); *C09K 2019/3422* (2013.01); *G02F 2001/133726* (2013.01)

(56) References Cited

U.S. PATENT DOCUMENTS

| | | | | |
|---|---|---|---|---|
| 2005/0224758 A1* | 10/2005 | Yamamoto | ............. | C09K 19/20 252/299.63 |
| 2011/0248216 A1* | 10/2011 | Klasen-Memmer | ......................... | C09K 19/3001 252/299.62 |
| 2012/0075542 A1* | 3/2012 | Kim | .................. | G02F 1/133707 349/33 |
| 2013/0112918 A1* | 5/2013 | Matsumura | ............ | C09K 19/44 252/299.61 |
| 2014/0211137 A1* | 7/2014 | Kaneoya | ............ | C09K 19/3066 349/108 |
| 2015/0184075 A1* | 7/2015 | Wen | ........................ | C09K 19/30 252/299.63 |
| 2016/0230092 A1* | 8/2016 | Li | ....................... | C09K 19/3402 |

FOREIGN PATENT DOCUMENTS

| | | | |
|---|---|---|---|
| CN | 103820128 A | * | 5/2014 |
| CN | 104263383 A | * | 1/2015 |
| CN | 104371745 A | * | 2/2015 |
| CN | 104513666 A | * | 4/2015 |
| CN | 104560058 A | * | 4/2015 |
| CN | 104591982 A | * | 5/2015 |
| CN | 104610978 A | * | 5/2015 |
| CN | 104628541 A | * | 5/2015 |
| EP | 0062470 A1 | | 10/1982 |
| JP | 1261494 A | | 10/1989 |
| JP | 680603 A | | 3/1994 |
| JP | 20153911 A | | 1/2015 |
| KR | 1020100117030 A | | 11/2010 |

OTHER PUBLICATIONS

English translation of CN 103666485. (Year: 2014).*
English translation of CN 103820128. (Year: 2014).*
English translation of CN 104560058 (Year: 2015).*
English translation of CN 104628541. (Year: 2015).*
English translation of CN 104610978. (Year: 2015).*
English translation of CN 104591982. (Year: 2015).*
English translation of CN 104371745. (Year: 2015).*
English translation of CN 104263383. (Year: 2015).*
English translation of CN 104513666. (Year: 2015).*

* cited by examiner

LIQUID CRYSTAL COMPOSITION AND LIQUID CRYSTAL DISPLAY INCLUDING THE SAME

CROSS-REFERENCE TO RELATED APPLICATIONS

This application claims priority to Korean Patent Application No. 10-2015-0167424 filed on Nov. 27, 2015 in the Korean Intellectual Property Office, and all the benefits accruing therefrom under 35 U.S.C. § 119, the entire contents of which are incorporated herein by reference.

BACKGROUND

1. Field

The present disclosure relates to a liquid crystal composition and a liquid crystal display including the same.

2. Description of the Related Art

A liquid crystal display, which is one of the most widely used flat panel displays, includes two substrates provided with field generating electrodes, such as a pixel electrode and a common electrode, and a liquid crystal layer disposed between the two substrates.

With the expansion of application fields of liquid crystal displays, characteristics improvements, such as response speed improvement, contrast improvement, and drive voltage reduction, have been required. For the characteristics improvements, the liquid crystal compound contained in a liquid crystal composition requires low rotational viscosity, high chemical stability, high physical stability, high liquid crystal phase-isotropic phase transition temperature, low lower limit temperature of liquid crystal phase, appropriate elastic modulus, and the like. For high-speed response characteristics, a liquid crystal material having low rotational viscosity is required.

SUMMARY

Aspects of the present disclosure provide a liquid crystal composition containing a liquid crystal compound having improved thermostability and photostability, and a liquid crystal display including the liquid crystal composition.

Aspects of the present disclosure provide a liquid crystal composition containing a low-viscosity liquid crystal compound having improved thermostability and photostability, and a liquid crystal display including the liquid crystal composition.

According to an embodiment, a liquid crystal composition includes at least one of: a first compound represented by Chemical Formula 1; a second compound represented by Chemical Formula 2; and a third compound represented by Chemical Formula 2'

Chemical Formula 1

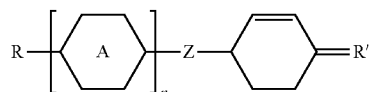

Chemical Formula 2

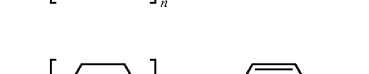

Chemical Formula 2'

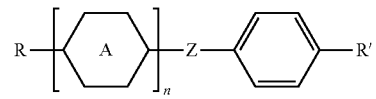

wherein in the Chemical Formula 1 or 2 or 2', R is one of an alkyl group of $C_{1-5}$, a halogen, and a cyano group; R' is an alkyl group of $C_{1-5}$; Z is one of (CO)O, O(CO), $CF_2O$, $OCF_2$, $CH_2O$, $OCH_2$, $SCH_2$, $CH_2S$, $C_2F_4$, $CH_2CF_2$, $CF_2CH_2$, $(CH_2)m$, CH=CH, CF=CF, CH=CF, CF=CH, C≡C, CH=CHCH$_2$O, and a single bond;

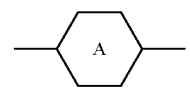

is one of

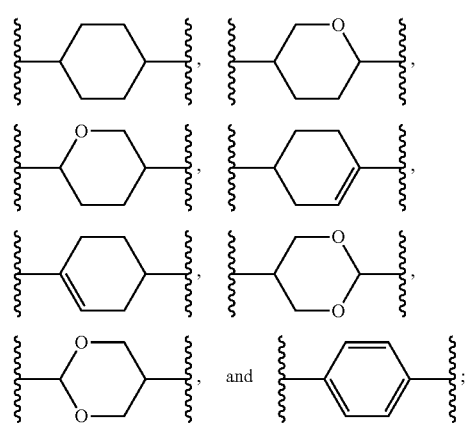

n is 0 to 3; and m is 2 to 5.

According to another embodiment, a liquid crystal display includes a first display panel including a thin film transistor; a second display panel facing the first display panel; and a liquid crystal layer disposed between the first display panel and the second display panel, including at least one of a first compound represented by Chemical Formula 1 below, a second compound represented by Chemical Formula 2 below, and a second compound represented by Chemical Formula 2' below, and a reactive mesogen:

Chemical Formula 1

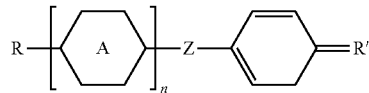

Chemical Formula 2

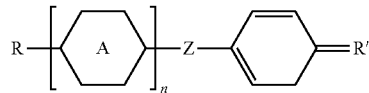

-continued

Chemical Formula 2'

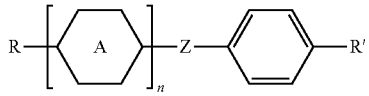

wherein in the chemical formula 1 or 2, R is one of an alkyl group of $C_{1-5}$, a halogen, and a cyano group; R' is an alkyl group of $C_{1-5}$; Z is one of (CO)O, O(CO), $CF_2O$, $OCF_2$, $CH_2O$, $OCH_2$, $SCH_2$, $CH_2S$, $C_2F_4$, $CH_2CF_2$, $CF_2CH_2$, $(CH_2)_m$, CH=CH, CF=CF, CH=CF, CF=CH, C≡C, CH=CHCH$_2$O, and a single bond;

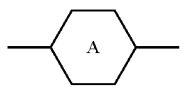

is one of

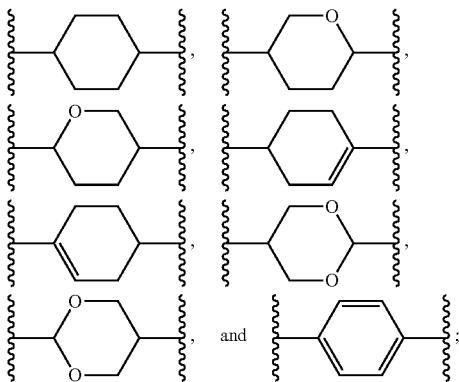

n is 0 to 3; and m is 2 to 5.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
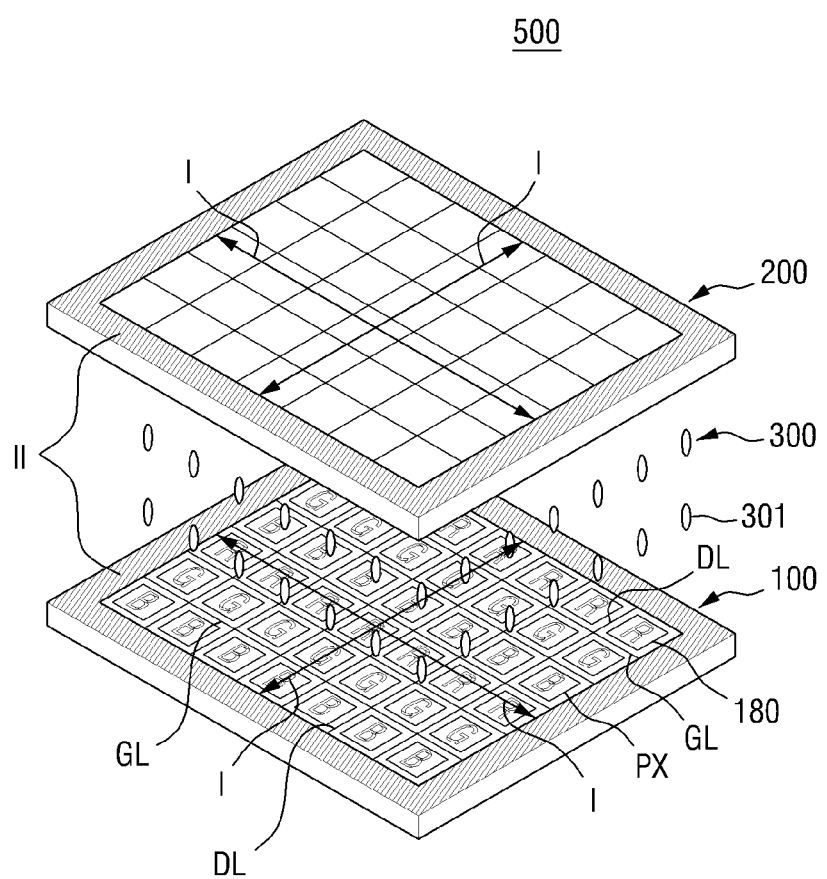
FIG. 1 is a schematic exploded perspective view of a first liquid crystal display.

Some embodiments are described with reference to the accompanying drawings. The described embodiments may be embodied in many different forms and should not be construed as being limited to the description set forth herein. In the drawings, sizes of layers and regions may be exaggerated for clarity.

Although the terms "first", "second", etc. may be used herein to describe various elements, these elements should not be limited by these terms. These terms may be used to distinguish one element from another element. Thus, a first element described in this application may be termed a second element without departing from teachings of one or more embodiments. The description of an element as a "first" element may not require or imply the presence of a second element or other elements. The terms "first", "second", etc. may also be used to differentiate different categories or sets of elements. For conciseness, the terms "first", "second", etc. may represent, for example, "first-category (or first-set)", "second-category (or second-set)", etc., respectively.

When a first element is referred to as being "on", "connected to", or "coupled to" a second element, the first element can be directly on, directly connected to, or directly coupled to the second element, or one or more intervening elements may be present. In contrast, when a first element is referred to as being "directly on", "directly connected to", or "directly coupled to" a second element, there are no intervening elements intentionally provided between the first element and the second element. Like numbers may refer to like elements in this application. The term "and/or" includes any and all combinations of one or more of the associated items. "Or" means "and/or."

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of embodiments.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

As used herein, "alkyl" means a straight or branched chain, saturated, monovalent hydrocarbon group (e.g., methyl or hexyl) having the specified number of carbon atoms. "Alkoxy" means an alkyl group that is linked via an oxygen (i.e., alkyl-O—), for example methoxy, ethoxy, and sec-butyloxy groups. "Aryl" means a hydrocarbon group having the specified number of carbon atoms and an aromatic ring, and includes monocyclic and polycyclic hydrocarbons wherein the additional ring(s) of the polycyclic hydrocarbon may be aromatic or nonaromatic (e.g., phenyl or naphthyl). "Vinyl" means an alkyl group having ethylenically unsaturated terminal group (e.g., vinyl, allyl, or pent-4-en-1-yl). "Vinyloxy" means a vinyl group that is linked via an oxygen, for example allyloxy or pent-4-en-1-oxy groups. "Carboxylate ester group" means a group having the specified number of carbon atoms, of the formula —(CO)OR wherein R is an alkyl group. "2-Methylene-alkan-1-one group means a group having the specified number of carbon atoms, of the formula —(CO)C(CH$_2$=CH$_2$)R wherein R is hydrogen or an alkyl group.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the present specification, "$C_{A-B}$" means that the number of carbon atoms is A to B.

Hereinafter, preferred embodiments will be described in detail with reference to the attached drawings.

Figure 2:
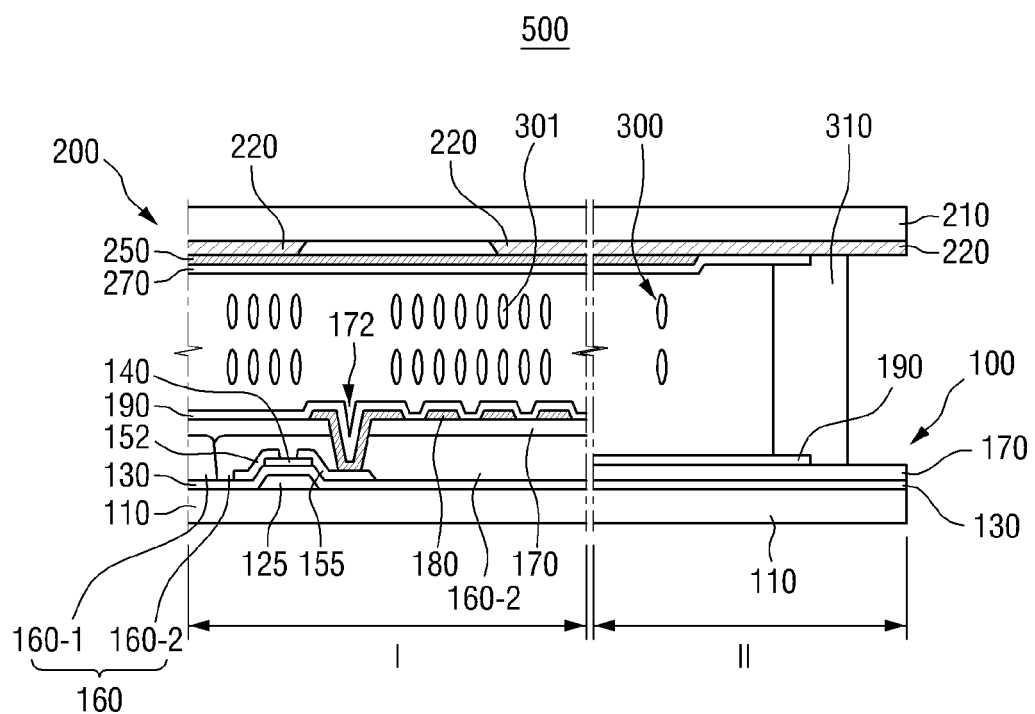
FIG. 2 is a schematic cross-sectional view of the initial state of the first liquid crystal display of FIG. 1, to which an electric field is not applied.

FIG. 1 is a schematic exploded perspective view of a first liquid crystal display. FIG. 2 is a schematic cross-sectional view of the initial state of the first liquid crystal display of FIG. 1, to which an electric field is not applied.

Referring to FIGS. 1 and 2, the first liquid crystal display 500 includes: a first display panel 100; a second display panel 200 disposed to face the first substrate 100 and be spaced apart from the first substrate 100 while maintaining a predetermined cell gap; and a liquid crystal layer 300 disposed between the first display panel 100 and the second display panel 200.

Each of the first display panel 100 and the second display panel 200 includes a display area I and a non-display area II. The display area I is an area in which an image is displayed. The non-display area II is a peripheral area surrounding the display area I, and is an area in which an image is not displayed.

The liquid crystal layer 300 may include liquid crystal molecules 301, and the liquid crystal molecules 301 may be liquid crystal molecules having negative dielectric anisotropy, also designated as 301. Hereinafter, the liquid crystal molecules having negative dielectric anisotropy 301 are referred to as negative liquid crystal molecules 301.

The first display panel 100 and the second display panel 200 may be attached to each other by a seal line 310 made of a sealant.

In the initial state in which an electric field is not applied to the first liquid crystal display 500, the negative liquid crystal molecules 301 are aligned substantially vertically to the first display panel 100 and the second display panel 200. In this case, the fact that the negative liquid crystal molecules 301 are aligned substantially vertically to the first display panel 100 and the second display panel 200 means that the negative liquid crystal molecules 301 are aligned at a pretilt angle of 88° to 90° to the first display panel 100 and the second display panel 200.

The pretilt angle means an angle between the first display panel 100 and the director of the negative liquid crystal molecules 301 and an angle between the second display panel 200 and the director of the negative liquid crystal molecules 301. Meanwhile, a polar angle means an angle between the virtual normal line perpendicular to the first display panel 100 and the director of the negative liquid crystal molecules 301 and an angle between the virtual normal line perpendicular to the second display panel 200 and the director of the negative liquid crystal molecules 301.

The seal line 310, which is a peripheral portion of the first display panel 100 and the second display panel 200, may be disposed on the non-display area II. The seal line 310 is formed along the periphery of the display area I to surround the display area I.

A predetermined space may be defined between the first display panel 100 and the second display panel 200, and the liquid crystal layer 300 is disposed in the predetermined space, thereby preventing the liquid crystal molecules 301 from being discharged to the outside.

In the display area I of the first display panel 100, a plurality of gate lines GL extending in a first direction and a plurality of data lines DL extending in a second direction perpendicular to the first direction may be formed. In the display area I of the first display panel 100, a plurality of pixels PX arranged in the form of a matrix are defined by the gate lines GL and the data line DL, and a pixel electrode 180 may be disposed for each pixel PX.

In the non-display area II of the first display panel 100, a drive unit (not shown) for providing a gate drive signal and a data drive signal to each pixel PX of the display area I may be disposed.

The first display panel 100 may be configured to include a thin film transistor array substrate, a pixel electrode 180, and a first liquid crystal alignment layer 190. The thin film transistor array substrate may be configured to include a first substrate 110, a gate line GL, a gate electrode 125, a gate insulating film 130, a semiconductor layer 140, a data line DL, a source electrode 152, a drain electrode 155, a color filter layer 160, an organic film 170, and a pixel electrode 180. The thin film transistor, which is a switching element, may be configured to include a gate electrode 125, a gate insulating film 130, a semiconductor layer 140, a data line DL, a source electrode 152, a drain electrode 155.

The second display panel 200, which is a counter substrate of the first display panel 100, may be configured to a second substrate 210, a light-blocking pattern 220, a common electrode 240, and a common electrode 250, and a second liquid crystal alignment layer 270.

The first substrate 110, which is a base substrate of the first display panel 100, may include a display area I and a non-display area II. The first substrate 110 may be a transparent insulating substrate made of glass or transparent plastic.

The gate line GL made of a conductive material and the gate electrode 125 protruding therefrom are disposed on the first substrate 110 of the display area I. Although not shown in the drawing, the gate line GL may extend to the non-display area II, and may form a gate pad (not shown) in the non-display area II. The gate line GL and the gate electrode 125 are covered by the gate insulating film 130. The gate insulating film 130 may extend to the non-display area II.

The semiconductor layer 140 and an ohmic contact layer (not shown) may be formed on the gate insulating film 130 of the display area I. The source electrode 152 branched from the data line DL and the drain electrode 155 spaced apart from the source electrode 152 may be formed on the semiconductor layer 140 and the ohmic contact layer. Although not shown in the drawing, the data line DL may extend to the non-display area II, and may form a data pad (not shown) in the non-display area II.

The color filter layer 160 may be formed on the source electrode 152 and the drain electrode 155. The color filter layer 160 may be formed in a region corresponding to each pixel PX in the display area I, and includes a first color filter 160-1 and a second color filter 160-2. For example, the first color filter 160-1 and the second color filter 160-2 may be color filters realizing different colors from each other. Each of the first color filter 160-1 and the second color filter 160-2 may be one of a red color filter (R), a green color filter (G), and a blue color filter (B). The first color filter 160-1 and the second color filter 160-2 may be arranged alternately.

The organic film 170 made of an organic material may be formed on the color filter layer 160. The organic film 170 may extend to the non-display area II.

On the organic film 170, the pixel electrode 180 made of a conductive material may be formed for each pixel PX. The pixel electrode may be electrically connected with the drain electrode 155 through a contact hole penetrating the organic film 170 and the color filter layer 160 to expose the drain electrode 155. The pixel electrode 180 may be made of indium tin oxide, indium zinc oxide, indium oxide, zinc oxide, tin oxide, gallium oxide, titanium oxide, aluminum, silver, platinum, chromium, molybdenum, tantalum, niobium, zinc, magnesium, an alloy thereof, or a laminate thereof.

The pixel electrode 180 may be a pattern electrode having at least one of a protrusion pattern and a slit 172 pattern. For example, the pixel electrode 180 may be a pattern electrode having the slit 172 pattern. The pixel electrode 180 can receive a data voltage through a thin film transistor which is a switching element. The gate electrode 125, which is a control terminal of the thin film transistor, may be connected to the gate line GL, the source electrode 152, which an input terminal of the thin film transistor, may be connected to the data line DL, and the drain electrode 155, which an output terminal of the thin film transistor, may be electrically connected to the pixel electrode through the contact hole. The channel of the thin film transistor may be formed by the semiconductor layer 140. The semiconductor layer 140 may be disposed to overlap the gate electrode 125. The source electrode 152 and the drain electrode 155 may be spaced apart from each other based on the semiconductor layer 140. The pixel electrode 180 forms an electric field together with the common electrode 250 to control the alignment direction of the liquid crystal molecules 301 in the liquid crystal layer 300 disposed between the pixel electrode 180 and the common electrode 250.

The second substrate 210, which is a base substrate of the second display panel 200, may include a display area I and a non-display area II. The second substrate 210 may be a transparent insulating substrate made of glass or transparent plastic.

The light-blocking pattern 220 may be formed on the second substrate 210. The light-blocking pattern 220 is generally referred to as a black matrix. In the display area I of the second substrate 210, the light-blocking pattern 220 is disposed at the boundary of the first color filter 160-1 and the second color filter 160-2 to overlap the first color filter 160-1 and the second color filter 160-2, and may extend to the non-display area II of the second substrate 210. The light-blocking pattern 220 of the non-display area II of the second substrate 210 may have a width larger than that of the light-blocking pattern 220 of the display area I of the second substrate 210.

The common electrode 250 may be disposed on the light-blocking pattern 220. The common electrode 250 may be a patternless electrode having neither a slit pattern nor a protrusion pattern. In this case, the first liquid crystal display 500 may be configured such that the pattern electrode is formed in only the first display panel 100, and the patternless electrode is formed in the second display panel 200, thereby controlling the alignment of the liquid crystal molecules 301 using the pattern electrode.

The common electrode 250 may be made of indium tin oxide, indium zinc oxide, indium oxide, zinc oxide, tin oxide, gallium oxide, titanium oxide, aluminum, silver, platinum, chromium, molybdenum, tantalum, niobium, zinc, magnesium, an alloy thereof, or a laminate thereof. The common electrode 250 may formed to cover the entire display area I. The integrally formed common electrode 250 may be disposed over the entire display area I without regard to the pixel PX. The common electrode 250 may extend to a part of the non-display area II.

The first liquid crystal alignment layer 190 may be disposed on the pixel electrode 180. The first liquid crystal alignment layer 190 may extend to the non-display area II as well as the display area I.

Although not shown in the drawing, the first liquid crystal display 500 may additionally include a backlight unit (not shown) disposed under the first display panel 100 and an upper polarizer (not shown) disposed over the second display panel 200.

The backlight unit, for example, may include a light guide plate, a light source, a reflection member, and an optical sheet.

The light guide plate (LGP) serves to change the path of light emitted from the light source toward the liquid crystal layer 300, and may include a light incidence surface provided to allow the light emitted from the light source to be applied thereto, and a light emission surface emitting the incident light toward the liquid crystal layer 300. The light guide plate may be made of a material having a predetermined refractive index, such as polymethyl methacrylate (PMMA) or polycarbonate (PC), which are light transmissive materials, but the present disclosure is not limited thereto.

Since the light incident to one side or both sides of the light guide plate made of such a material has an angle within the critical angle, the light is transmitted to the inside of the light guide plate. Further, when the light is incident to the upper surface or lower surface of the light guide plate, the angle of the light exceeds the critical angle, so that the light is not emitted to the outside of the light guide plate, and is uniformly transmitted in the light guide plate.

A scattering pattern may be formed on any one of the upper and lower surfaces of the light guide plate, for example, on the upper surface facing the light emission surface, such that the guided light is emitted to the upper surface thereof. That is, the scattering pattern may be printed with ink on one side of the light guide plate such that the light transmitted in the light guide plate is emitted to the upper surface thereof. Such a scattering pattern may be formed by printing with ink, but is not limited thereto. Further, the light guide plate may be provided with fine grooves or protrusions, and may be variously modified.

A reflection member may further be provided between the light guide plate and the bottom of the storage member. The reflection member serves to reflect the light emitted to the lower surface of the light guide plate, that is, the opposite surface facing the light emission surface and supply the reflected light to the light guide plate. The reflection member may be fabricated in the form of a film, but the present disclosure is not limited thereto.

The light source may be disposed to face the light incidence surface of the light guide plate. The number of light sources can be appropriately changed as needed. For example, only one side of the light guide plate can be provided with one light source, and three or more light sources can also be provided corresponding to three or more sides of four sides of the light guide plate. Further, a plurality of light source can be provided corresponding to any one of the sides of the light guide plate. As described above, the side light type light source has been described as an example, but other examples thereof include a direct type light source and a surface shape type light source.

The light source may be a white LED emitting white light, and may also be a plurality of LEDs emitting red light (R), green light (G), and blue light (B), respectively. In the case where the plurality of light sources are realized as the plurality of LEDs emitting red light (R), green light (G), and blue light (B), respectively, when these light sources turn on at once, white light can be realized by color mixing.

The first liquid crystal display 500 shown in FIGS. 1 and 2 illustrates a color filter on array (COA) structure in which the first display panel 100 includes the color filter layer 160. However, a liquid crystal display according to an embodiment of the present disclosure is not limited to the first liquid crystal display 500.

Figure 3:
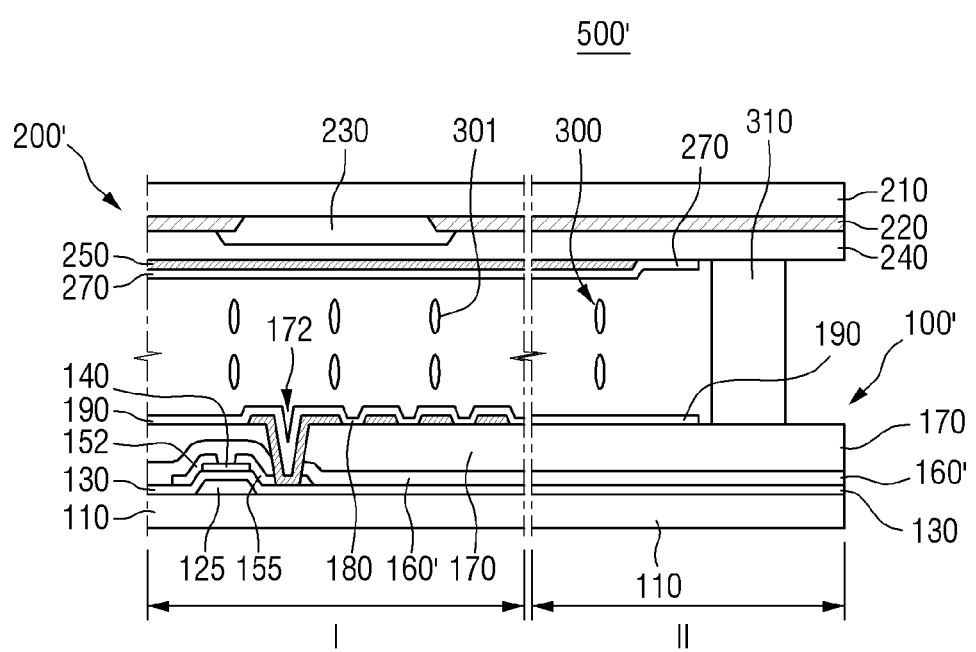
FIG. 3 is a schematic cross-sectional view of the initial state of a second liquid crystal display, to which an electric field is not applied.

FIG. 3 is a schematic cross-sectional view of the initial state of a second liquid crystal display 500', to which an electric field is not applied. Hereinafter, the differences between the first liquid crystal display 500 and the second liquid crystal display 500' will be described in detail with reference to FIGS. 2 and 3.

Referring to FIGS. 2 and 3, the first display panel 100' of the second liquid crystal display 500' is different from the first display panel 100 of the first liquid crystal display 500 in that the first display panel 100' does not include a color filter layer. The first display panel 100' is different from the first display panel 100 designed to have a structure in which the color filter layer 160 is disposed on the source electrode 152 and the drain electrode 155 in that the first display panel 100' is designed to have a structure in which a passivation film 160' is disposed on the source electrode 152 and the drain electrode 155. The passivation film 160' is an inorganic insulating film, such as a silicon nitride film, a silicon oxide film, or a silicon oxynitride film, which is made of an insulating material, and can be omitted in some cases.

The second display panel 200' of the second liquid crystal display 500' is different from the second display panel 200 of the first liquid crystal display 500 in that the second display panel 200' includes a color filter layer 230 and an overcoat layer 240. The second display panel 200' is different from the second display panel 200 designed to have a structure in which the common electrode 250 is disposed on the second substrate 210 and the light-blocking pattern 220 in that the color filter layer 230 is disposed on the second substrate 210 and the light-blocking pattern 220, the overcoat layer 240 is disposed on the color filter layer 230 and the light-blocking pattern 220, and the common electrode 250 is disposed on the overcoat layer 240.

Hereinafter, the liquid crystal layer 300 will be described in more detail. The liquid crystal layer 300 includes a liquid crystal composition, including at least one liquid crystal compound of: a first compound represented by Chemical Formula 1 below; a second compound represented by Chemical Formula 2 below; and a third compound represented by Chemical Formula 2' below.

Chemical Formula 1

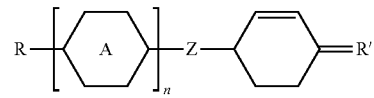

Chemical Formula 2

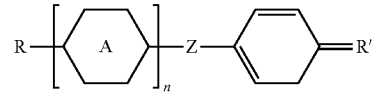

Chemical Formula 2'

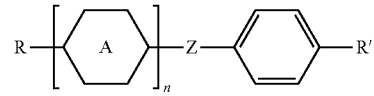

In the Chemical Formula 1 or 2 or 2', R is one of an alkyl group of $C_{1-5}$, a halogen, and a cyano group; R' is an alkyl group of $C_{1-5}$; Z is one of (CO)O, O(CO), $CF_2O$, $OCF_2$, $CH_2O$, $OCH_2$, $SCH_2$, $CH_2S$, $C_2F_4$, $CH_2CF_2$, $CF_2CH_2$, $(CH_2)_m$, CH=CH, CF=CF, CH=CF, CF=CH, C≡C, CH=CHCH$_2$O, and a single bond;

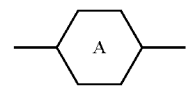

is one of

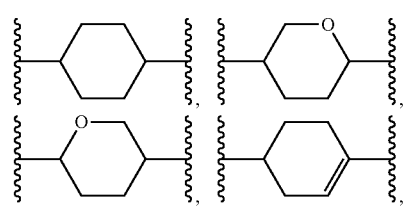

-continued

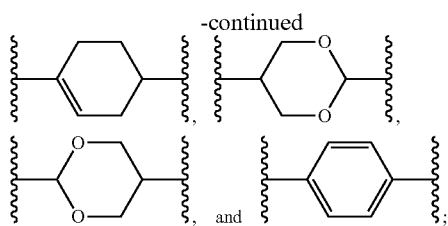

n is 0 to 3; and m is 2 to 5.

The liquid crystal compound includes a conjugated double bond system in which double bonds are present with single bonds therebetween, and does not include a terminal double bond vulnerable to heat and ultraviolet light. The single bond is composed of a sigma bond (σ bond), whereas the double bond is composed of a sigma bond and a pi bond (π bond). Since the pi bond is vulnerable to heat and ultraviolet light compared to the sigma bond, a terminal double bond in which a double bond is located at the end of a chain is apt to be thermally and optically decomposed by heat and ultraviolet light compared to an internal double bond in which a double bond is located in the middle of a chain and single bonds are located at the ends thereof.

Thus, the conjugated double bond system without any terminal double bonds can provide improved thermostability and photostability to the liquid crystal compound. Therefore, the liquid crystal layer 300 can have improved thermostability and photostability. In this regard, detailed description will be explained with reference to the following experimental results shown in FIGS. 4 and 5.

The first compound may be one of the compounds represented by Formulae 1-1 to 1-8 below.

(1-1)
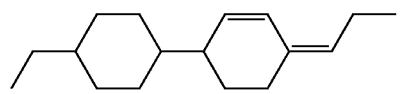

(1-2)
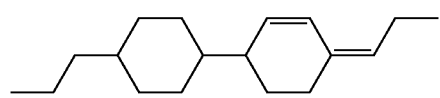

(1-3)
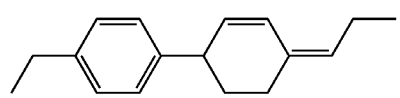

(1-4)
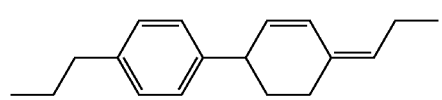

(1-5)
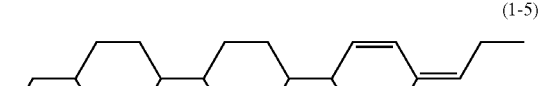

(1-6)
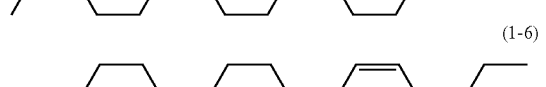

(1-7)
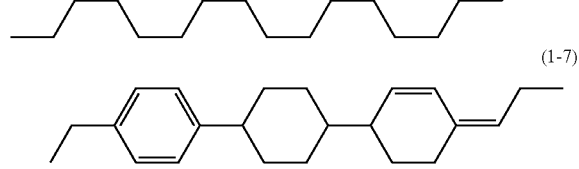

-continued (1-8)
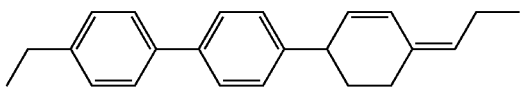

The second compound may be one of the compounds represented by Formulae 2-1 to 2-8 below.

(2-1)
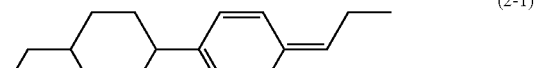

(2-2)
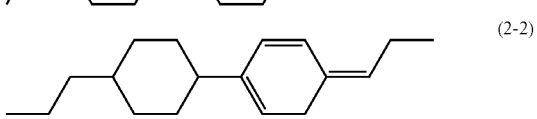

(2-3)
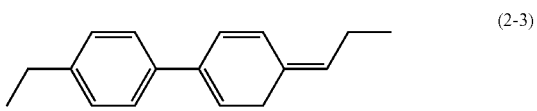

(2-4)
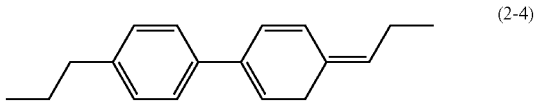

(2-5)
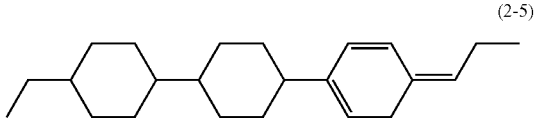

(2-6)
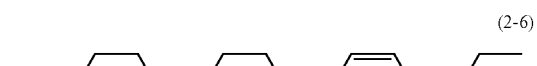

(2-7)
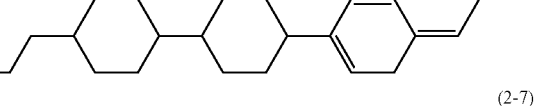

(2-8)
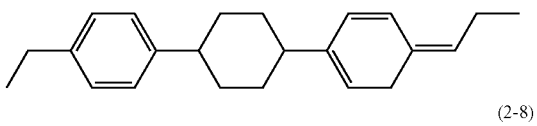

The third compound may be one of the compounds represented by Chemical Formulae 2'-1 to 2'-8 below.

(2'-1)

(2'-2)

(2'-3)

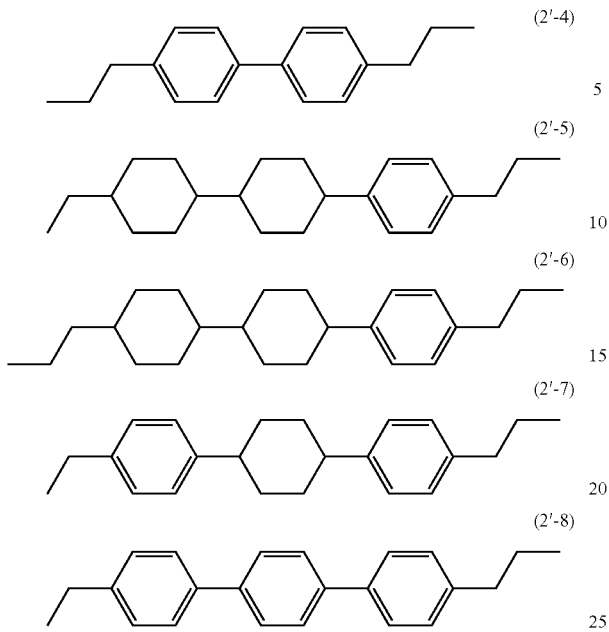

The liquid crystal composition may further include: at least one of the compositions represented by Chemical Formulae 3-1 to 3-19 below. The refractive anisotropy of the composition may be 0.08 to 0.12, the dielectric anisotropy of the composition, measured under conditions of a temperature of 20° C. and a frequency of 1 kHz, may be −5.5 to −2.8, and the rotational viscosity of the composition, measured under a condition of a temperature of 20° C., may be 70 mPa·s to 140 mPa·s.

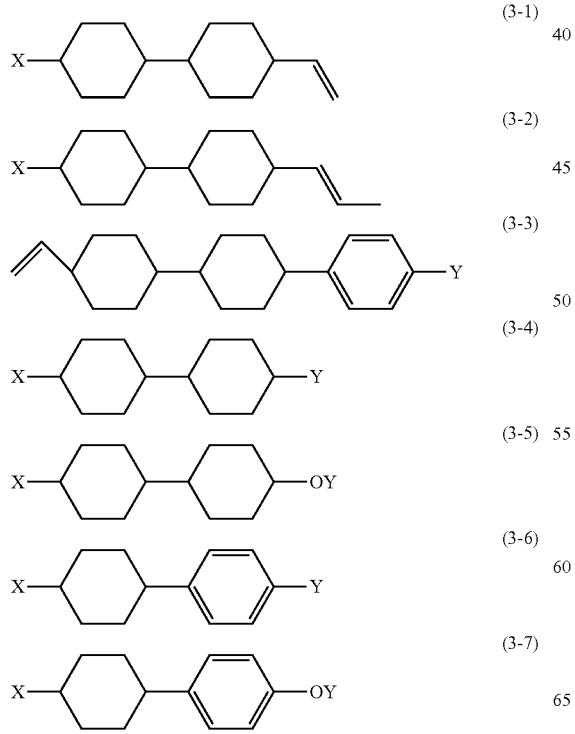

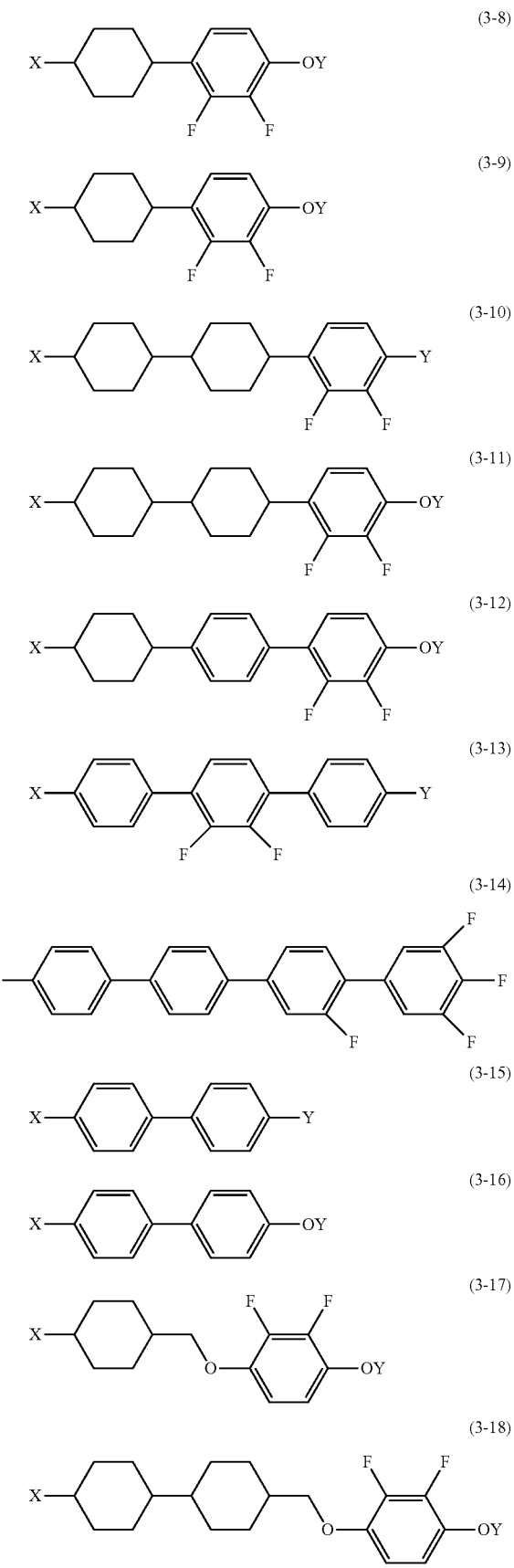

(3-19)

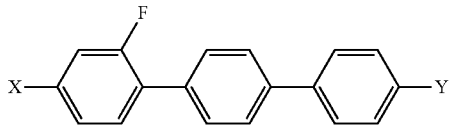

In the chemical formulae 3-1 to 3-19, X and Y are each independently an alkyl group of $C_{1-5}$.

Since the compound represented by Chemical Formula 1-1, similarly to the compound represented by Chemical Formula 3-1, is a compound having two rings, this compound has low-viscosity characteristics capable of entirely or partially alternating the compound represented by Chemical Formula 3-1. Further, the compound of Chemical Formula 1, the compound of Chemical Formula 2, and the compound of Chemical Formula 2', each having a conjugated double bond, may have improved thermostability compared to the compound represented by Chemical Formula 3-1 and the compound represented by Chemical Formula 3-3, each having a terminal double bond.

Therefore, the liquid crystal composition, for example, in an embodiment does not include the compound represented by Chemical Formula 3-1, the compound represented by Chemical Formula 3-3, or the combination thereof. That is, the content of the compound represented by Chemical Formula 3-1, the compound represented by Chemical Formula 3-3, or the combination thereof in the liquid crystal composition may be 0 wt %.

For example, when the compound represented by Chemical Formula 3-1 is a compound represented by Chemical Formula C-1 below, in the liquid crystal composition, the compound represented by Chemical Formula C-1 is entirely replaced by the compound represented by Chemical Formula 1-1, that is, the content of the compound represented by Chemical Formula C-1 is designed to be 0 wt %, thereby lowering the viscosity of the liquid crystal composition, realizing the high-speed response characteristics of the liquid crystal display, and improving the reliability of the liquid crystal display due to improved thermostability.

Chemical Formula C-1

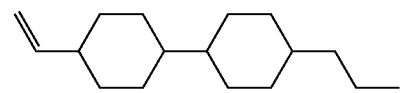 [SMILES: C=CC1CCC(C2CCC(CCC)CC2)CC1]

Meanwhile, compound of Chemical Formula 1, the compound of Chemical Formula 2, or the compound of Chemical Formula 2' can improve the voltage holding rate of the liquid crystal composition. The voltage holding rate thereof will be described in detail with reference to the following Experimental Examples.

The performance evaluation results of the liquid crystal composition of Comparative Example and the liquid crystal composition of Example are summarized in Table 1 and Table 2 below.

TABLE 1

| Comparative Example | Liquid crystal compound | Content (wt %) | Performance evaluation |
|---|---|---|---|
| Comparative liquid crystal composition | (structure) | 20 | Δn (ne-no): 0.104<br>Δε (ε∥-ε⊥): −3.1<br>γ1: 89 mPa · s<br>VHR (UV 10J): 88.6%<br>Thermostability evaluation (140° C., 4 hours): peak of thermal decomposition product occurred |
| | (structure) | 15 | |
| | (structure) | 15 | |
| | (structure) | 5 | |
| | (structure) | 10 | |

TABLE 1-continued

| Comparative Example | Liquid crystal compound | Content (wt %) | Performance evaluation |
|---|---|---|---|
| | 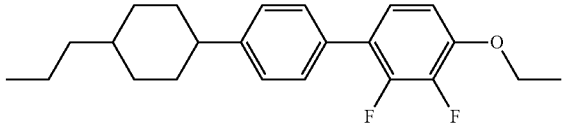 [SMILES: CCCC1CCC(c2ccc(-c3ccc(OCC)c(F)c3F)cc2)CC1] | 10 | |
| | 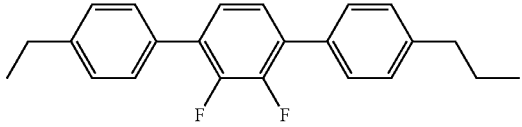 | 15 | |

TABLE 2

| Experimental Example | Liquid crystal compound | Content (wt %) | Performance evaluation |
|---|---|---|---|
| Experimental liquid crystal composition | 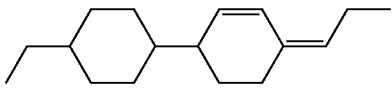 [SMILES: CC/C=C1\C=CC(C2CCC(CC)CC2)CC1] | 20 | Δn (ne-no): 0.104<br>Δε (ε∥-ε⊥): −3.1<br>γ1: 91 mPa · s<br>VHR (UV 10J): 91.2%<br>Thermostability evaluation (140° C., 4 hours): peak of thermal decomposition product did not occur |
| | 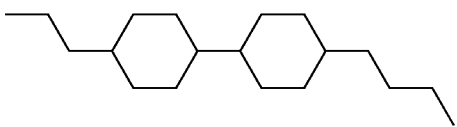 [SMILES: CCCCC1CCC(C2CCC(CCC)CC2)CC1] | 15 | |
| | 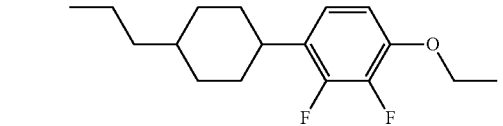 [SMILES: CCCC1CCC(c2ccc(OCC)c(F)c2F)CC1] | 15 | |
| | 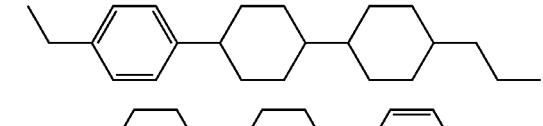 | 5 | |
| | 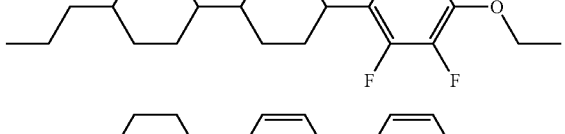 | 10 | |
| | 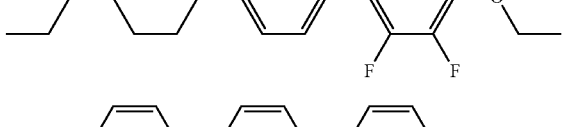 | 10 | |
| | 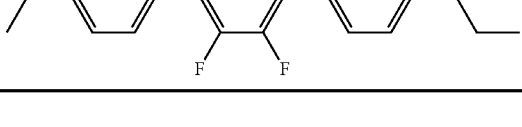 | 15 | |

Figure 4:
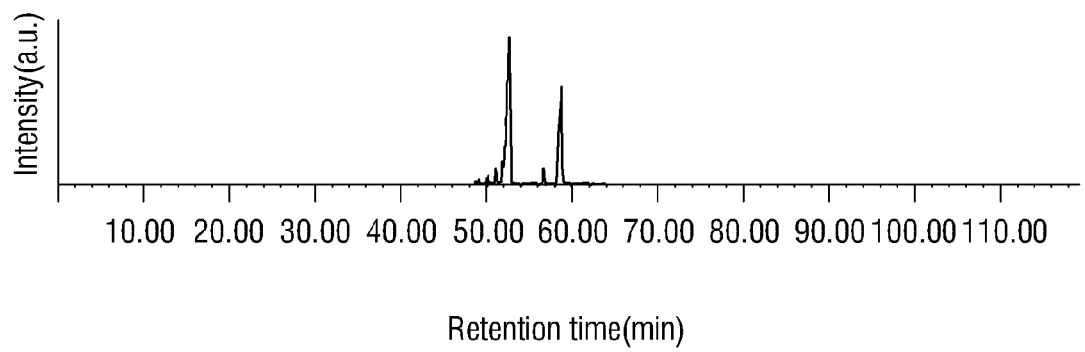
FIG. 4 is a graph showing the results of gas chromatography-mass spectrometry of a conventional liquid crystal composition containing a low-viscosity liquid crystal compound having a terminal double bond.

FIG. 4 shows the results of analysis of gas chromatography-mass spectrometry of the comparative liquid crystal composition of Table 1 stored at a temperature of 140° C. for 4 hours. The comparative liquid crystal composition includes the compound represented by Chemical Formula C-1, which is a low-viscosity liquid crystal compound and is used for improving the high-speed response characteristics. The compound represented by Chemical Formula C-1 has a structure in which an ethenyl group is bonded to one end of bicyclohexane and a propyl group is bonded to the other end thereof.

Referring to FIG. 4, a first peak was observed at a retention time of about 50 minutes, and a second peak, the intensity of which is lower than that of the first peak, was observed at a retention time of about 60 minutes. The first peak is a peak for the compound represented by Chemical Formula C-1, and the second peak is presumed to be a peak for the decomposition product of the compound represented by Chemical Formula C-1.

As shown in FIG. 4, as the result of the experiment to determine thermostability of the comparative liquid crystal composition, a compound presumed to be a decomposition product was discovered, and thus the ratio of intensity of the second peak to intensity of the first peak was not 0.

In contrast, as the result of analyzing the experimental liquid crystal composition of Table 2 stored at a temperature of 140° C. for 4 hours using gas chromatography-mass spectrometry, in the graph of analysis of gas chromatography-mass spectrometry of the experimental liquid crystal composition, a peak was observed at the substantially same time as that in the first peak, and was not observed at the substantially same time as that in the second peak.

Figure 5:
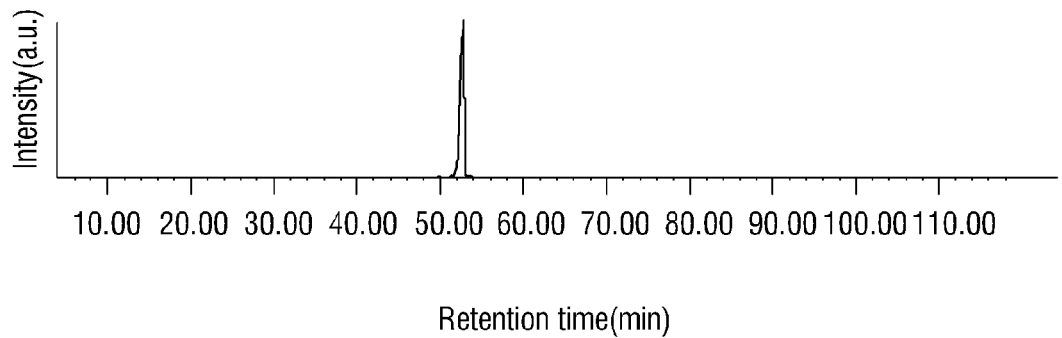
FIG. 5 is a graph showing the results of gas chromatography-mass spectrometry of a liquid crystal composition containing a low-viscosity liquid crystal compound having a conjugated double bond according to an embodiment.

FIG. 5 shows the results of analysis of gas chromatography-mass spectrometry of the experimental liquid crystal composition of Table 2 stored at a temperature of 140° C. for 4 hours. Referring to FIG. 5, the ratio of intensity of the peak observed at the substantially same time as that in the second peak to intensity of the peak observed at the substantially same time as that in the first peak is 0.

It was found that the experimental liquid crystal composition including the compound represented by Chemical Formula 1-1 has very excellent thermostability. While not wanting to be bound by theory, the reason for this is thought that the compound represented by Chemical Formula 1-1 has a conjugated double bond.

The liquid crystal layer 300 may include a reactive mesogen. Further, meanwhile, the liquid crystal layer 300 and the liquid crystal alignment layer 190 or 270 may include the reactive mesogen and a polymer thereof.

The reactive mesogen, which is a compound having a mesogenic structure for expressing liquid crystallinity and a polymerizable end group for polymerization, is represented by Chemical Formula RM below.

P1-SP1-MG-SP2-P2  Chemical Formula RM

In the Chemical Formula RM, each of P1 and P2 is a polymerizable end group, such as a (meth)acrylate group, a vinyl group, a vinyloxy group, or an epoxy group; SP1 is a spacer group for linking P1 and MG, such as an alkyl group having 1 to 12 carbon atoms or an alkoxy group having 1 to 12 carbon atoms; SP2 is a spacer group for linking P2 and MG, such as an alkyl group having 1 to 12 carbon atoms or an alkoxy group having 1 to 12 carbon atoms; MG is a mesogenic structure, such as cyclohexyl, biphenyl, terphenyl, or naphthalene.

Polymer-stabilized vertical alignment (PSA) is a technique for stabilizing the pretilt alignment of the liquid crystal molecules 301 through a polymer network composed of a polymer of reactive mesogens. For example, the liquid crystal alignment layer 190 or 270 may include a polyimide-based liquid crystal alignment layer and a polymer layer of the reactive mesogens disposed on the polyimide-based liquid crystal alignment layer.

The polymer-stabilized vertical alignment (PSA) can be realized by a method of adding the reactive mesogens to the liquid crystal composition or a method of adding the reactive mesogens to a liquid crystal aligning agent. Since the thermopolymerization or photopolymerization of the reactive mesogens is required, it is preferred that the liquid crystal molecules 301 have excellent thermostability and photostability.

However, since the compound represented by Chemical Formula C-1, which is a low-viscosity liquid crystal compound and is used for improving the high-speed response characteristics, has a terminal double bond, this compound has reduced thermostability and photostability. Therefore, as can be seen from Table 1, the comparative liquid crystal composition including the compound represented by Chemical Formula C-1 has a disadvantage of a low voltage holding rate.

In contrast, as can be seen from Table 2, the experimental liquid crystal composition including the compound represented by Chemical Formula 1-1 having a conjugated double bond has a relatively high voltage holding rate compared to that of the comparative liquid crystal composition. The experimental liquid crystal composition including the compound represented by Chemical Formula 1-1 having a conjugated double bond has an advantage of realizing the polymer-stabilized vertical alignment without deteriorating the display quality of the liquid crystal display.

Therefore, the liquid crystal composition according to an embodiment may not include the compound represented by Chemical Formula 3-1, the compound represented by Chemical Formula 3-3, or a combination thereof.

As described above, according to embodiments, there are the following effects.

The liquid crystal composition according to an embodiment has improved thermostability and photostability. While not wanting to be bound by theory, it is believed the improved stability is because the liquid crystal composition contains a liquid crystal compound having a conjugated double bond.

When the liquid crystal composition according to an embodiment contains a low-viscosity liquid crystal compound having a conjugated double bond, the liquid crystal composition can improve both reliability and high-speed response characteristic of the liquid crystal display.

The effects of the present disclosure are not limited by the foregoing, and other various effects are anticipated herein.

Although the preferred embodiments have been disclosed for illustrative purposes, those skilled in the art will appreciate that various modifications, additions and substitutions are possible, without departing from the scope and spirit of the disclosure as disclosed in the accompanying claims.

What is claimed is:
1. A liquid crystal composition, comprising at least one of:
a first compound represented by Chemical Formula 1; or
a second compound represented by Chemical Formula 2;
and optionally
a third compound represented by Chemical Formula 2':

Chemical Formula 1

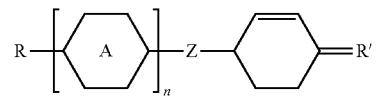

Chemical Formula 2

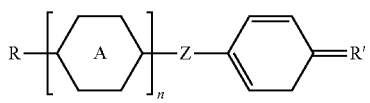

Chemical Formula 2'

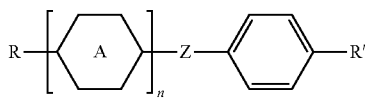

wherein in the Chemical Formulae 1 or 2 or 2',

R is one of an alkyl group of $C_{1-5}$, a halogen, and a cyano group;

R' is an alkyl group of $C_{1-5}$;

Z is one of (CO)O, O(CO), $CF_2O$, $OCF_2$, $CH_2O$, $OCH_2$, $SCH_2$, $CH_2S$, $C_2F_4$, $CH_2CF_2$, $CF_2CH_2$, $(CH_2)_m$, CH=CH, CF=CF, CH=CF, CF=CH, C≡C, $CH=CHCH_2O$, and a single bond;

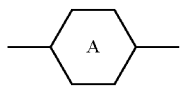

is one of

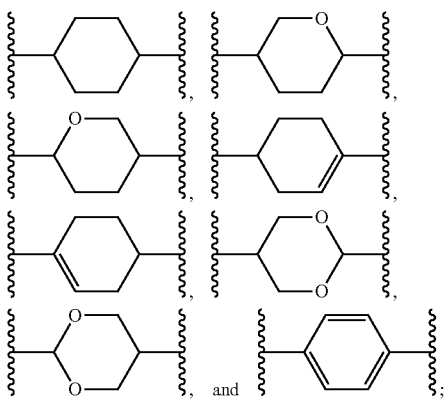

n is 0 to 3; and
m is 2 to 5.

2. The liquid crystal composition of claim 1, wherein, in the results of gas chromatography-mass spectrometry of the liquid crystal composition, measured after storing the composition at a temperature of 140° C. for 4 hours, the ratio of peak intensity of a decomposition product to peak intensity of the at least one of the first compound and the second compound is 0.

3. The liquid crystal composition of claim 1, wherein the voltage holding rate of the liquid crystal composition, measured under a condition of ultraviolet irradiation of 10 J, is greater than 90%.

4. The liquid crystal composition of claim 1, wherein the first compound is one of the compounds represented by Chemical Formulae (1-1) to (1-8), and the second compound is one of the compounds represented by Chemical Formulae (2-1) to (2-8), and the third compound is one of the compounds represented by Chemical Formulae (2'-1) to (2'-8):

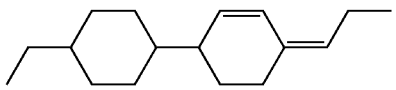 (1-1)

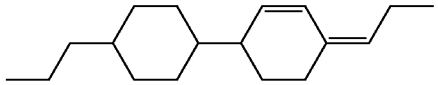 (1-2)

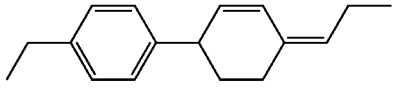 (1-3)

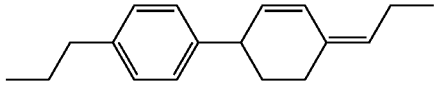 (1-4)

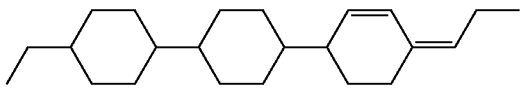 (1-5)

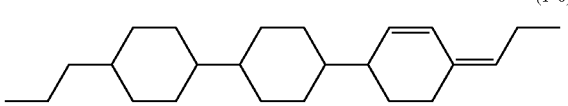 (1-6)

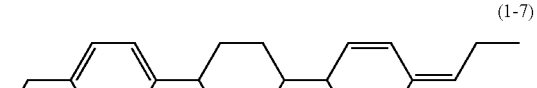 (1-7)

 (1-8)

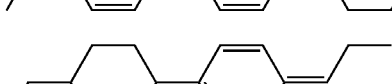 (2-1)

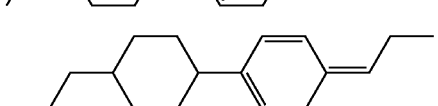 (2-2)

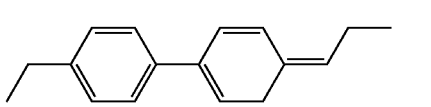 (2-3)

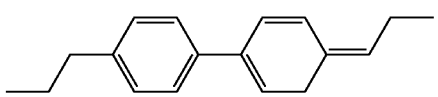 (2-4)

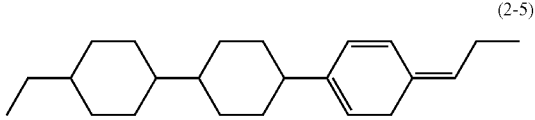 (2-5)

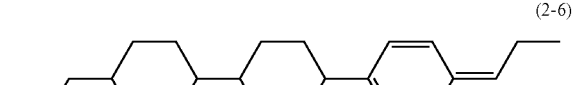 (2-6)

 (2-7)

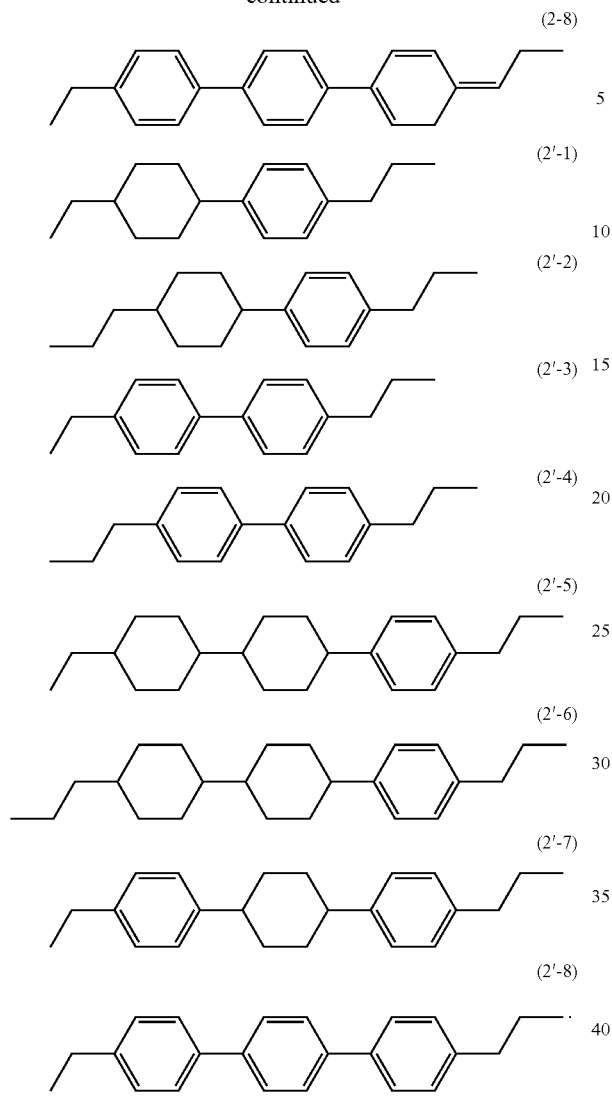
5. The liquid crystal composition of claim 1, further comprising: at least one of the compounds represented by Chemical Formulae (3-1) to (3-5), (3-7) to (3-14), and (3-16) to (3-19):
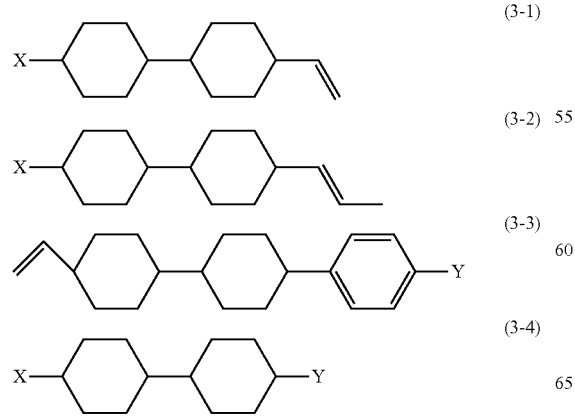
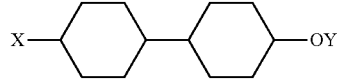
(3-5)
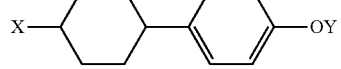
(3-7)
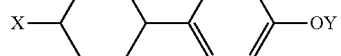
(3-8)
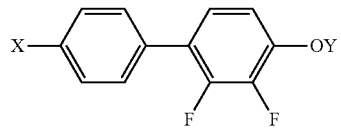
(3-9)
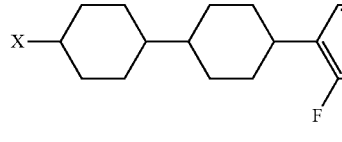
(3-10)
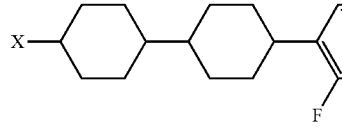
(3-11)
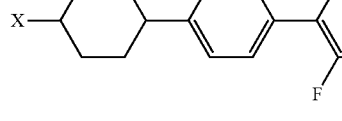
(3-12)
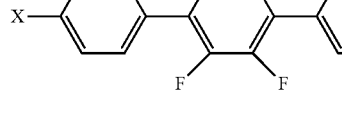
(3-13)
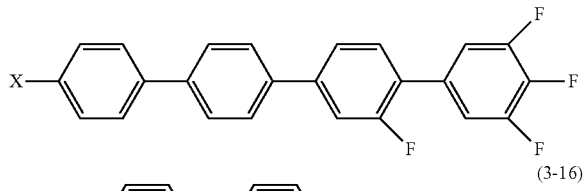
(3-14)
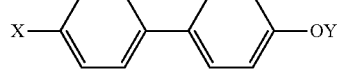
(3-16)
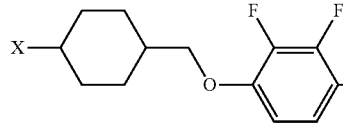
(3-17)
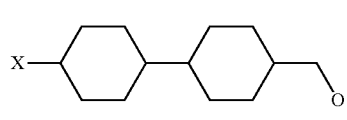
(3-18)

-continued (3-19)
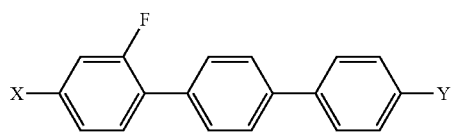

wherein X and Y are each independently an alkyl group of $C_{1-5}$.

6. The liquid crystal composition of claim 1,
further comprising: at least one of the compounds represented by Chemical Formulae (3-2) to (3-5), (3-7) to (3-14), and (3-16) to (3-19):

(3-2)
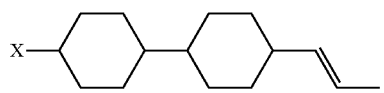

(3-3)
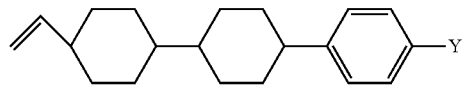

(3-4)
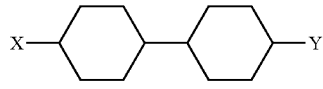

(3-5)
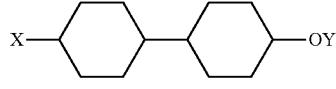

(3-7)
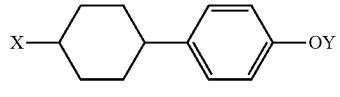

(3-8)
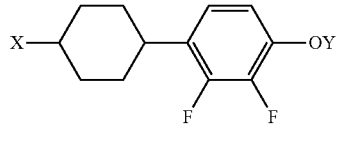

(3-9)
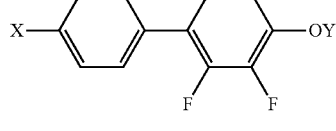

(3-10)
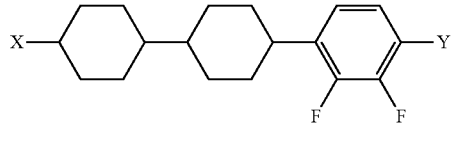

(3-11)
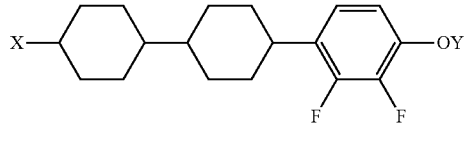

(3-12)
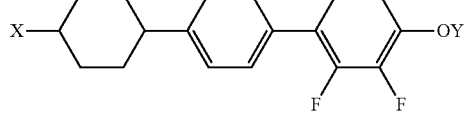

-continued (3-13)
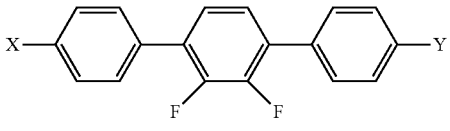

(3-14)
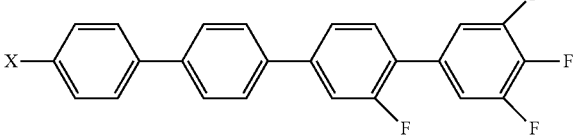

(3-16)

(3-17)
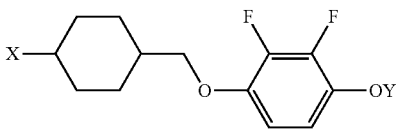

(3-18)
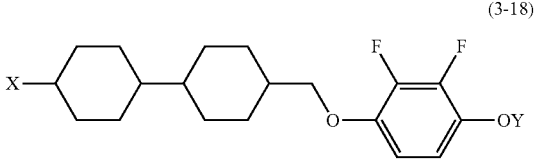

(3-19)
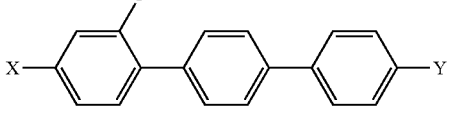

wherein a content of the compound represented by Chemical Formula (3-1) is 0 wt %, (3-1)
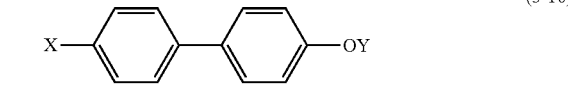

and wherein X and Y are each independently an alkyl group of $C_{1-5}$.

7. The liquid crystal composition of claim 1,
further comprising: at least one of the compounds represented by Chemical Formulae (3-1), (3-2), (3-4), (3-5), (3-7) to (3-14), and (3-16) to (3-19):

(3-1)
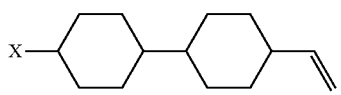

(3-2)
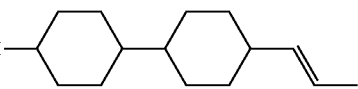

(3-4)
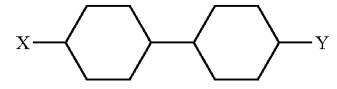

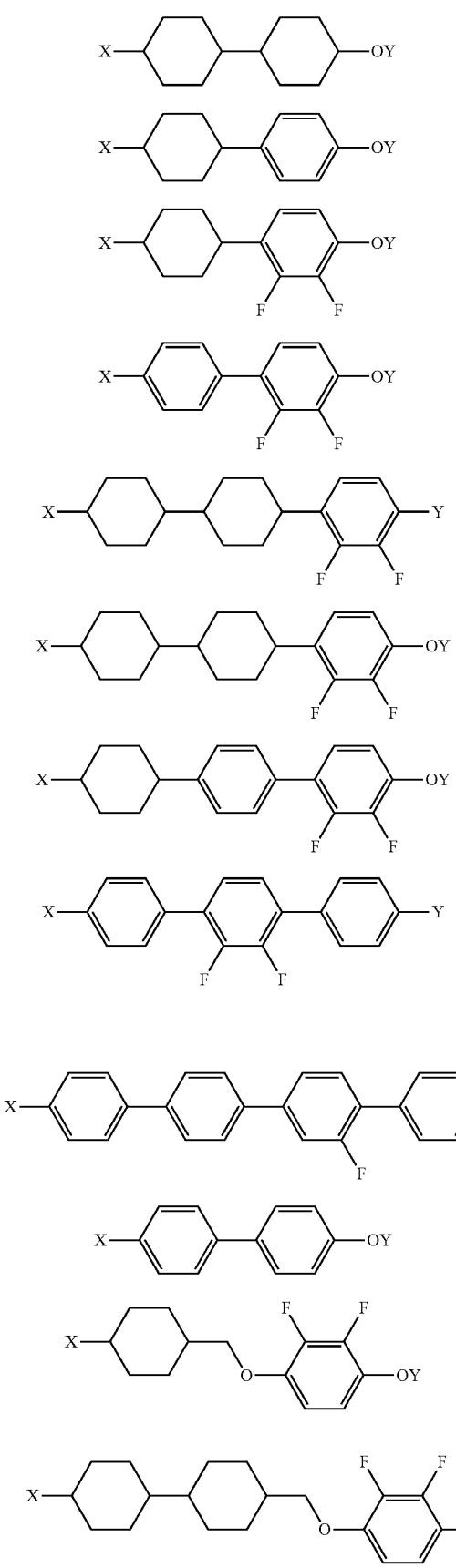

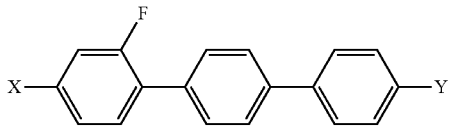

wherein a content of the compound represented by Chemical Formula (3-3) is 0 wt %,

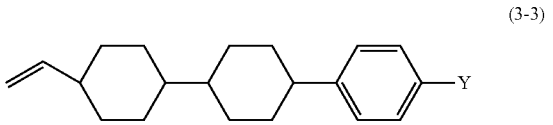

and wherein X and Y are each independently an alkyl group of $C_{1-5}$.

8. The liquid crystal composition of claim 1, wherein the refractive anisotropy of the composition is 0.08 to 0.12, the dielectric anisotropy of the composition, measured under conditions of a temperature of 20° C. and a frequency of 1 kHz, is −5.5 to −2.8, and the rotational viscosity of the composition, measured under a condition of a temperature of 20° C., is 70 mPa·s to 140 mPa·s.

9. A liquid crystal display, comprising:
a first display panel including a thin film transistor;
a second display panel facing the first display panel; and
a liquid crystal layer disposed between the first display panel and the second display panel, comprising at least one of a first compound represented by Chemical Formula 1, or a second compound represented by Chemical Formula 2, and optionally a third compound represented by Chemical Formula 2':

Chemical Formula 1

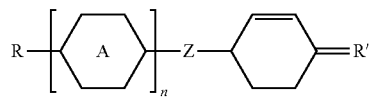

Chemical Formula 2

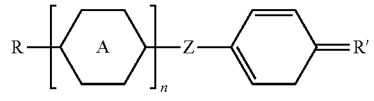

Chemical Formula 2'

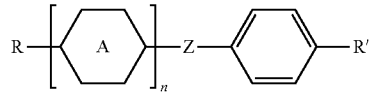

wherein in the Chemical Formulae 1 or 2 or 2',
R is one of an alkyl group of $C_{1-5}$, a halogen, and a cyano group;
R' is an alkyl group of $C_{1-5}$;
Z is one of (CO)O, O(CO), $CF_2O$, $OCF_2$, $CH_2O$, $OCH_2$, $SCH_2$, $CH_2S$, $C_2F_4$, $CH_2CF_2$, $CF_2CH_2$, $(CH_2)_m$, CH=CH, CF=CF, CH=CF, CF=CH, C≡C, $CH=CHCH_2O$, and a single bond;

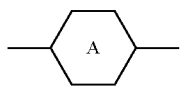

is one of

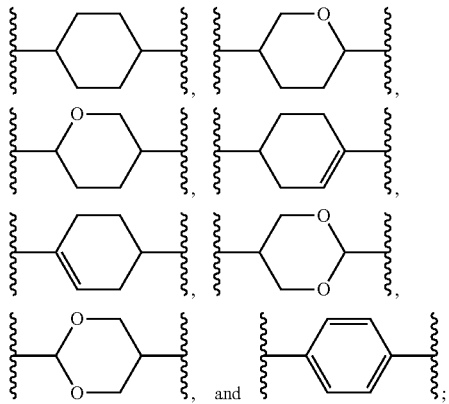

n is 0 to 3; and
m is 2 to 5.

10. The liquid crystal display of claim 9, further comprising: a liquid crystal alignment layer containing a reactive mesogen,
wherein the liquid crystal alignment film is disposed between any two of the first display panel and the second display panel and the liquid crystal layer.

11. The liquid crystal display of claim 9,
wherein the first compound is one of the compounds represented by Chemical Formulae (1-1) to (1-8), and the second compound is one of the compounds represented by Chemical Formulae (2-1) to (2-8), and the third compound is one of the compounds represented by Chemical Formulae (2'-1) to (2'-8):

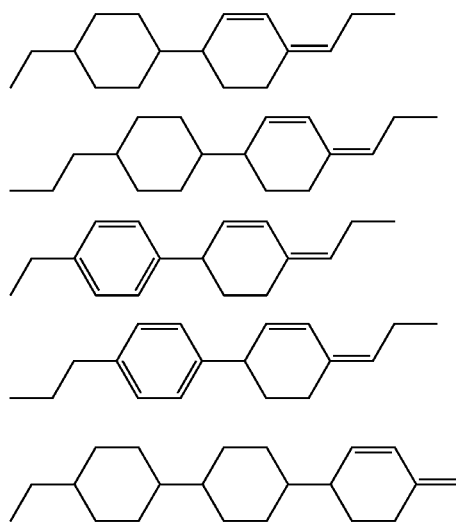

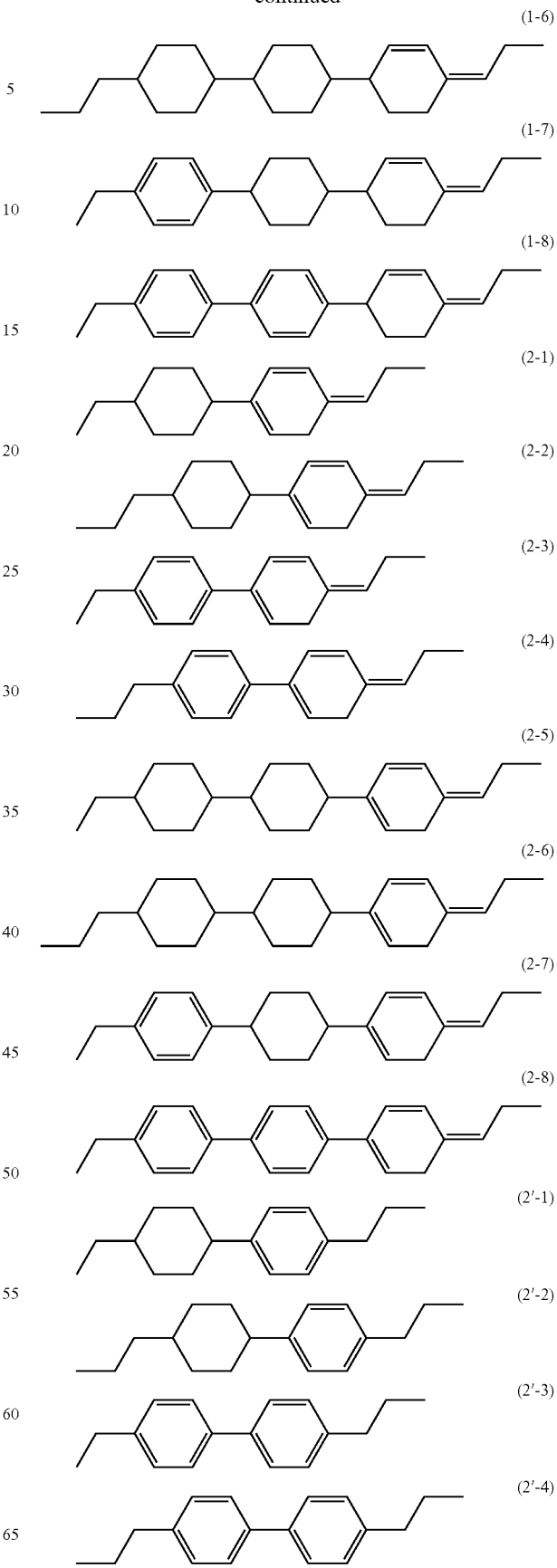

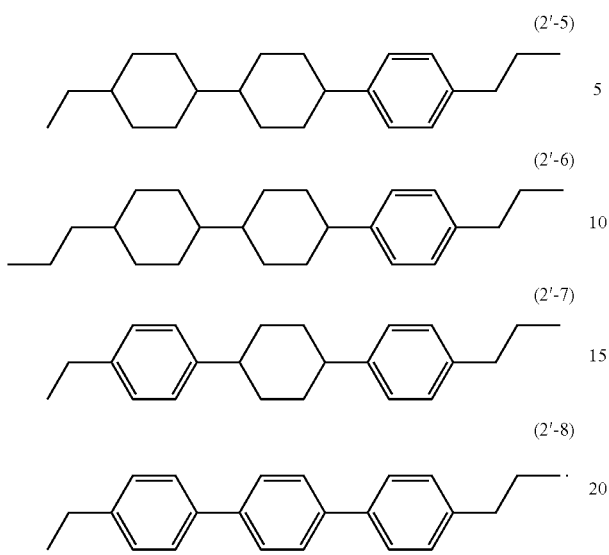

12. The liquid crystal display of claim 9, wherein the liquid crystal layer further includes at least one of the compounds represented by Chemical Formulae (3-1) to (3-5), (3-7) to (3-14), or (3-16) to (3-19):

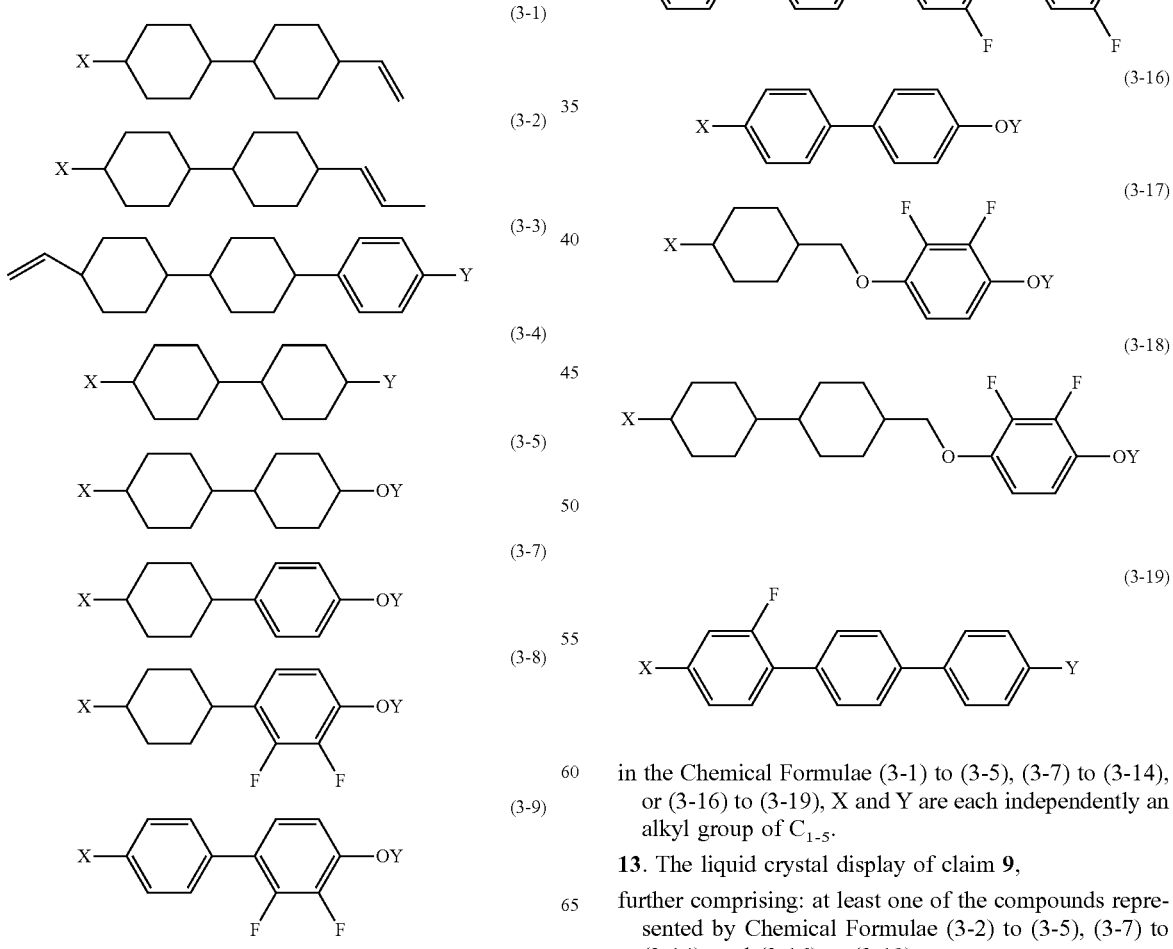

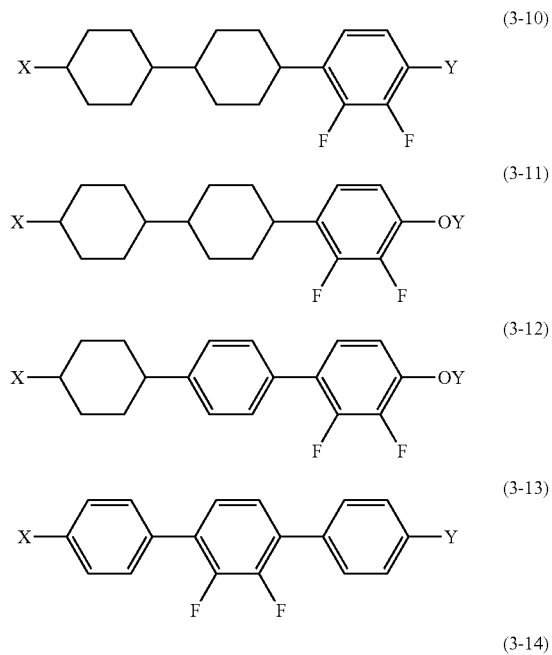

in the Chemical Formulae (3-1) to (3-5), (3-7) to (3-14), or (3-16) to (3-19), X and Y are each independently an alkyl group of $C_{1-5}$.

13. The liquid crystal display of claim 9, further comprising: at least one of the compounds represented by Chemical Formulae (3-2) to (3-5), (3-7) to (3-14), and (3-16) to (3-19):

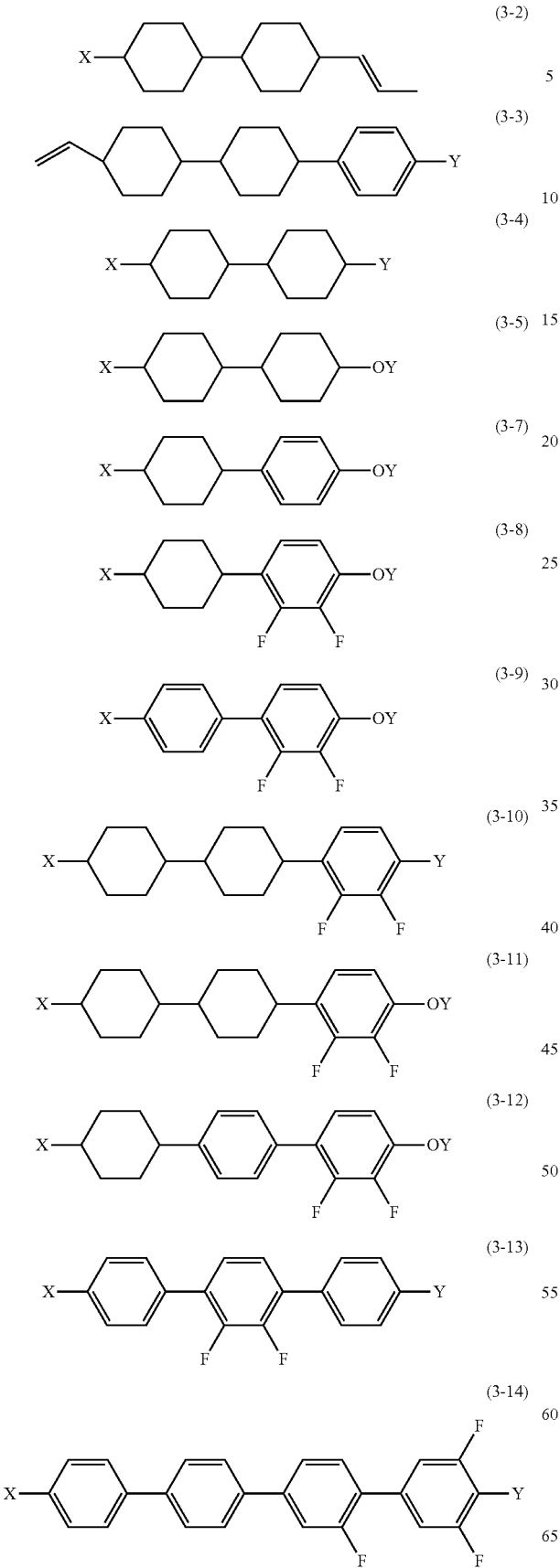
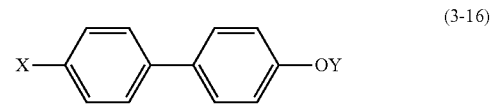
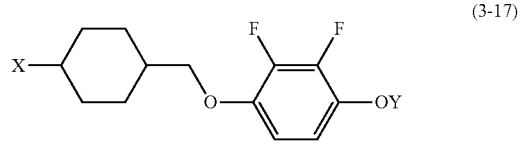
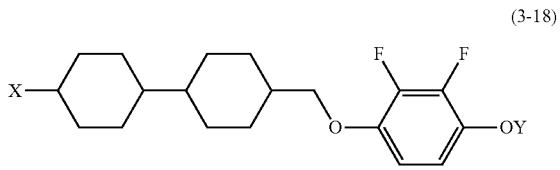
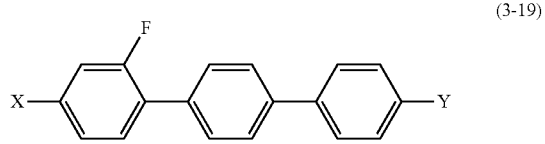
wherein a content of the compound represented by Chemical Formula (3-1) is 0 wt %,
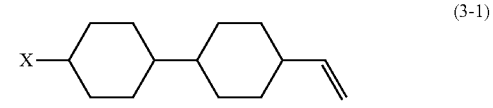
and wherein X and Y are each independently an alkyl group of $C_{1-5}$.
14. The liquid crystal display of claim 9,
further comprising: at least one of the compounds represented by Chemical Formulae (3-1), (3-2), (3-4), (3-5), (3-7) to (3-14), and (3-16) to (3-19):
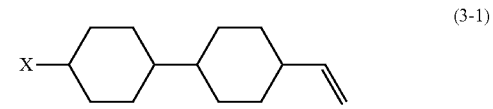
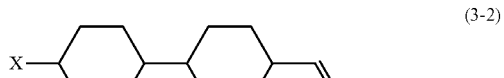
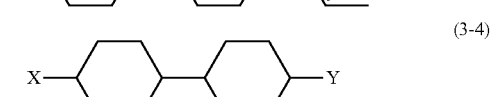
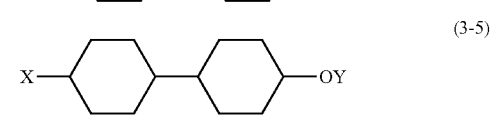
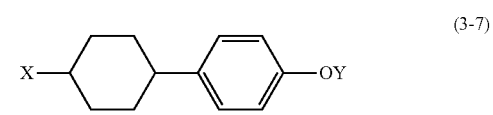

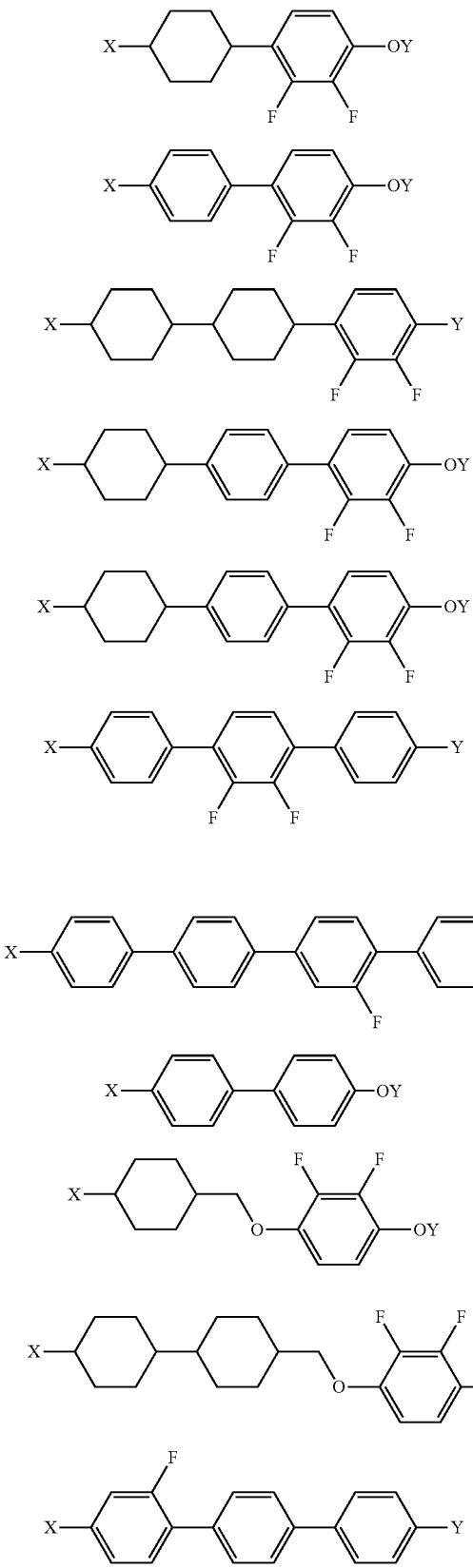

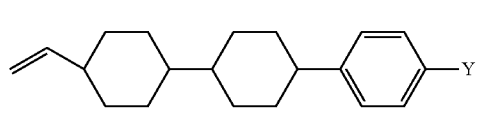

and wherein X and Y are each independently an alkyl group of $C_{1-5}$.

15. The liquid crystal composition of claim 1, comprising the first compound represented by Chemical Formula 1.

16. The liquid crystal composition of claim 1, comprising the second compound represented by Chemical Formula 2.

17. A liquid crystal composition, comprising:

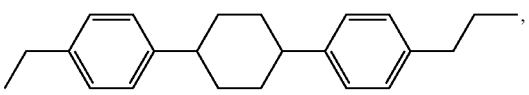

Chemical Formula 2'-7 and at least one of the compounds represented by Chemical Formulae 3-1 to 3-19:

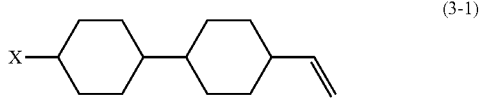

(3-1)

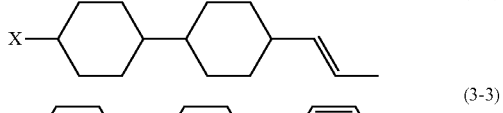

(3-2)

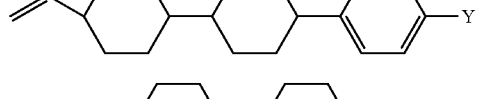

(3-3)

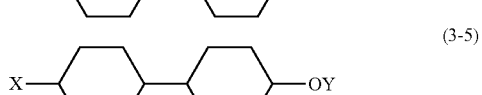

(3-4)

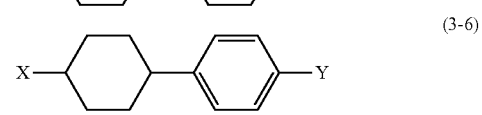

(3-5)

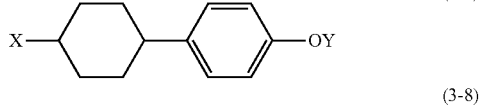

(3-6)

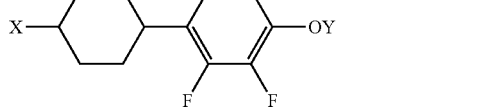

(3-7)

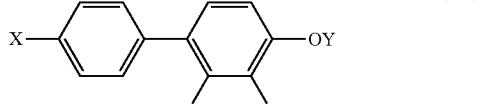

(3-8)

(3-9)

wherein a content of the compound represented by the Chemical Formula (3-3) is 0 wt %,

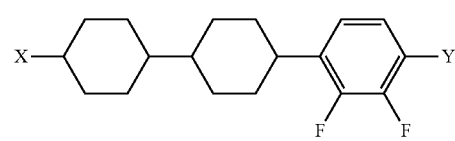
(3-10)
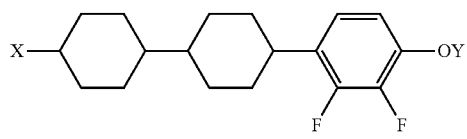
(3-11)
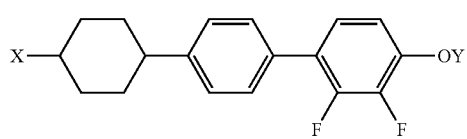
(3-12)
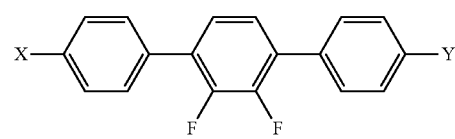
(3-13)
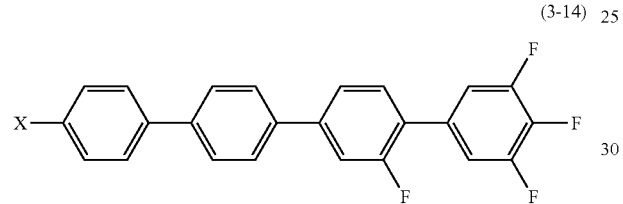
(3-14)
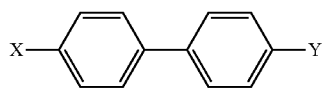
(3-15)
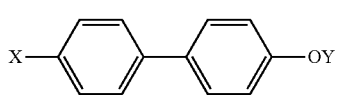
(3-16)
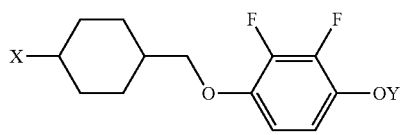
(3-17)
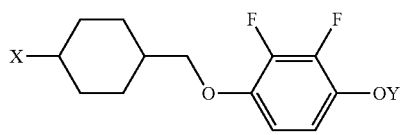
(3-18)
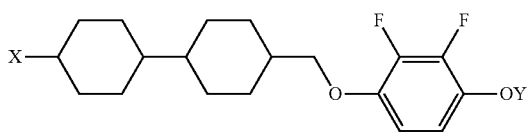
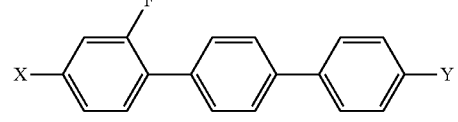
(3-19)
wherein X and Y are each independently an alkyl group of $C_{1-5}$.
* * * * *